(12) United States Patent
Chen et al.

(10) Patent No.: US 11,662,457 B2
(45) Date of Patent: May 30, 2023

(54) TERAHERTZ SECURITY INSPECTION ROBOT

(71) Applicants: NUCTECH COMPANY LIMITED, Beijing (CN); Tsinghua University, Beijing (CN)

(72) Inventors: Zhiqiang Chen, Beijing (CN); Ziran Zhao, Beijing (CN); Yan You, Beijing (CN); Yuanjing Li, Beijing (CN); Shixin Zhang, Beijing (CN); Huan Xie, Beijing (CN); Xuming Ma, Beijing (CN); Rui Fan, Beijing (CN); Yinglei Wang, Beijing (CN)

(73) Assignees: Tsinghua University, Beijing (CN); NUCTECH COMPANY LIMITED, Beijing (CN)

( * ) Notice: Subject to any disclaimer, the term of this patent is extended or adjusted under 35 U.S.C. 154(b) by 0 days.

(21) Appl. No.: 17/354,056

(22) Filed: Jun. 22, 2021

(65) Prior Publication Data

US 2021/0394366 A1 Dec. 23, 2021

(30) Foreign Application Priority Data

Jun. 23, 2020 (CN) .......................... 202010583713.0

(51) Int. Cl.
*B25J 9/16* (2006.01)
*G01S 13/88* (2006.01)
(Continued)

(52) U.S. Cl.
CPC .......... *B25J 9/1697* (2013.01); *G01S 13/887* (2013.01); *G01S 13/89* (2013.01); *G06T 7/50* (2017.01);
(Continued)

(58) Field of Classification Search
None
See application file for complete search history.

(56) References Cited

U.S. PATENT DOCUMENTS

| 2015/0036891 | A1* | 2/2015 | Takenouchi | ........... G06V 10/22 |
| | | | | 382/112 |
| 2018/0043952 | A1* | 2/2018 | Ellerman | ................. B60K 1/00 |

(Continued)

FOREIGN PATENT DOCUMENTS

| CN | 106161937 A | 11/2016 |
| CN | 206170086 U | 5/2017 |

(Continued)

*Primary Examiner* — Edemio Navas, Jr.
(74) *Attorney, Agent, or Firm* — Merchant & Gould P.C.

(57) ABSTRACT

A terahertz security inspection robot is provided, including: a housing including a main housing and a head housing rotatably connected to the main housing; a terahertz wave imaging mechanism including a mirror assembly arranged in the head housing and a detector array arranged in the main housing; and a rotating mechanism configured to cause the head housing and the mirror assembly located in the head housing to rotate with respect to the main housing, so that the mirror assembly of the terahertz wave imaging mechanism is oriented in different directions to respectively perform terahertz scanning and imaging on objects to be inspected in different inspection regions in a security inspection scene.

12 Claims, 6 Drawing Sheets

(51) Int. Cl.
    *G01S 13/89*     (2006.01)
    *G06K 9/20*     (2006.01)
    *G06T 7/50*     (2017.01)
    *G06T 7/70*     (2017.01)
    *H01Q 13/02*     (2006.01)
    *H01Q 21/06*     (2006.01)
    *H04N 5/232*     (2006.01)
    *H04N 5/247*     (2006.01)
    *G06V 10/143*     (2022.01)
    *G06V 10/147*     (2022.01)

(52) U.S. Cl.
    CPC .............. *G06T 7/70* (2017.01); *G06V 10/143* (2022.01); *G06V 10/147* (2022.01); *H01Q 13/02* (2013.01); *H01Q 21/064* (2013.01); *H04N 5/23299* (2018.08); *H04N 5/247* (2013.01); *G06V 2201/05* (2022.01)

(56) References Cited

U.S. PATENT DOCUMENTS

| | | |
|---|---|---|
| 2019/0056479 A1 | 2/2019 | Park et al. |
| 2019/0174077 A1* | 6/2019 | Mitani ................ G06T 3/4038 |
| 2022/0066065 A1* | 3/2022 | Zhao ................... G01V 5/0008 |

FOREIGN PATENT DOCUMENTS

| | | | |
|---|---|---|---|
| CN | 207139820 U | | 3/2018 |
| CN | 109333545 A | | 2/2019 |
| CN | 109581530 A | | 4/2019 |
| CN | 109725364 A | | 5/2019 |
| CN | 109856696 A | * | 6/2019 |
| CN | 109856696 A | | 6/2019 |
| CN | 111239074 A | | 6/2020 |
| CN | 211086647 U | * | 7/2020 |
| DE | 102017221938 A1 | | 2/2019 |
| JP | 2019058042 A | | 4/2019 |
| JP | 2019086523 A | | 6/2019 |

* cited by examiner

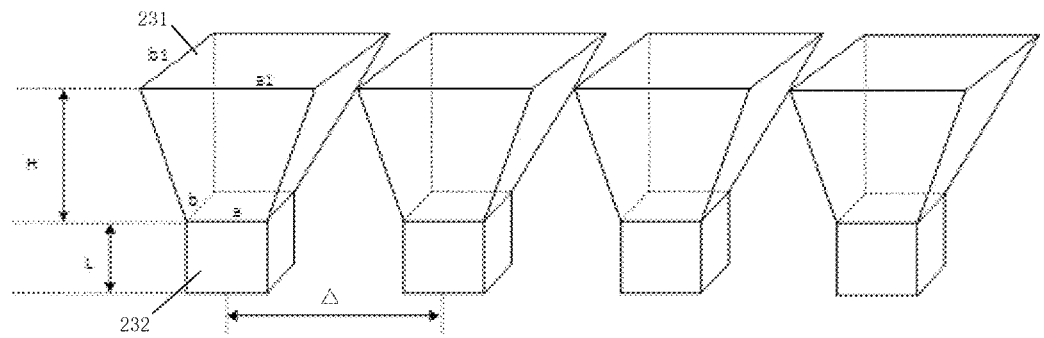
FIG. 8
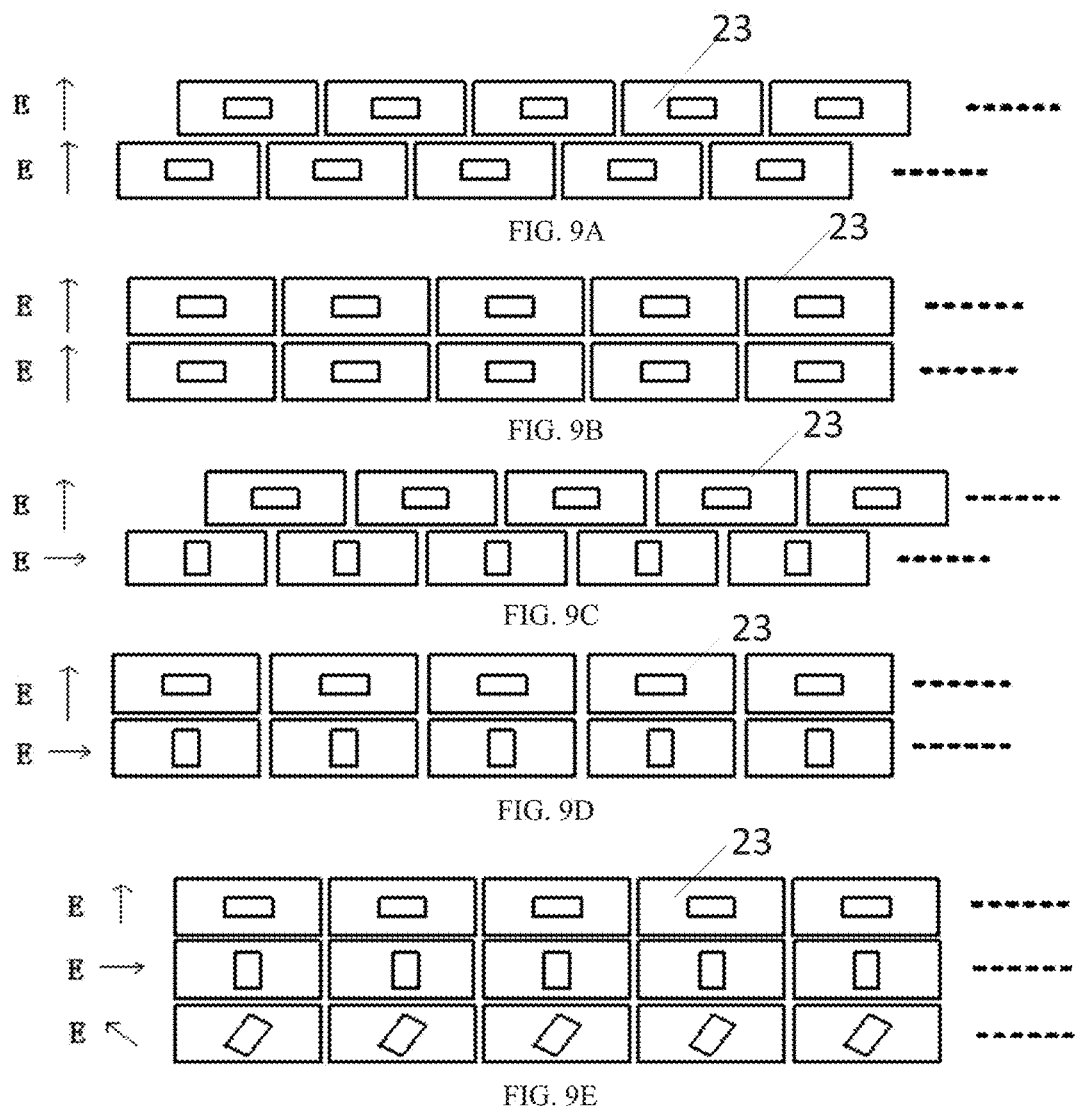
FIG. 9A
FIG. 9B
FIG. 9C
FIG. 9D
FIG. 9E

TERAHERTZ SECURITY INSPECTION ROBOT

CROSS-REFERENCE TO RELATED APPLICATION(S)

The present disclosure claims priority to Chinese Patent Application No. 202010583713.0, filed on Jun. 23, 2020, the disclosure of which is incorporated herein by reference in their entirety.

TECHNICAL FIELD

The present disclosure relates to a field of security inspection, and in particular to a terahertz security inspection robot.

BACKGROUND

Airports, railway stations, hotel receptions, campus gates, banks and other special places are crowded zones, and an accident may easily cause a serious event, so there is a high demand for security inspection. At present, manual inspection, hand-held metal detectors, metal detector doors, X-ray machines, explosive trace detection, liquid detectors and so on are generally used for security inspection in these places. Manual inspection has high accuracy but low efficiency, and a person being inspected is prone to resistance due to physical contact. Hand-held metal detectors and metal detection doors may only operate on metals, and may not detect non-metal dangerous objects. Explosives trace detection and liquid detectors both have shortcomings of single function and limited application. X-ray machines may only be used to detect items in a luggage or used in special places such as prison due to ionization of X-rays, and are easy to be questioned by the public in terms of safety.

SUMMARY

According to the embodiments of the present disclosure, there is provided a terahertz security inspection robot, including:

a housing, including a main housing and a head housing rotatably connected to the main housing;

a terahertz wave imaging mechanism, including a mirror assembly arranged in the head housing and a detector array arranged in the main housing; and a rotating mechanism configured to cause the head housing and the mirror assembly located in the head housing to rotate with respect to the main housing, so as to cause the mirror assembly of the terahertz wave imaging mechanism to be oriented in different directions to perform terahertz scanning and imaging on objects to be inspected in different inspection regions in a security inspection scene.

In some exemplary embodiments, the mirror assembly includes a mirror and a pitch and swing mechanism, and the pitch and swing mechanism is configured to drive the mirror to pitch and swing in a vertical direction so as to cause the mirror to perform terahertz scanning and imaging on parts of the object to be inspected with different heights.

In some exemplary embodiments, the rotating mechanism includes: a first ring gear connected to the head housing and located at a connection between the head housing and the main housing; a second ring gear located in the main housing and engaged with the first ring gear; and a driving mechanism configured to drive the second ring gear to rotate so as to drive the first ring gear to rotate, so that the head housing and the mirror assembly located in the head housing are driven to rotate.

In some exemplary embodiments, the head housing is provided with a window, so that a terahertz wave spontaneously radiated by the object to be inspected passes through the window and reaches the mirror assembly of the terahertz wave imaging mechanism.

In some exemplary embodiments, the detector array includes detectors arranged in a single row of arc or a plurality of rows of arcs, or arranged in a single row of straight line or a plurality of rows of straight lines.

In some exemplary embodiments, in a case that the detectors are arranged in a plurality of rows, the plurality of rows of detectors are aligned or staggered, and have different polarization directions.

In some exemplary embodiments, the terahertz security inspection robot further includes a visible light imaging mechanism provided on the head housing, and the visible light imaging mechanism is configured to capture a visible light image of the object to be inspected entering into the security inspection scene, and to determine, prior to the terahertz wave imaging mechanism performs the terahertz scanning and imaging, a direction of the object to be inspected with respect to the terahertz security inspection robot and a distance from the object to be inspected to the terahertz security inspection robot.

In some exemplary embodiments, a visible light image generated by the visible light imaging mechanism matches a terahertz wave image generated based on terahertz wave image data acquired by the terahertz wave imaging mechanism within a range of a depth of field of the terahertz wave imaging mechanism.

In some exemplary embodiments, the visible light image generated by the visible light imaging mechanism matching the terahertz wave image generated based on the terahertz wave image data acquired by the terahertz wave imaging mechanism within a range of a depth of field of the terahertz wave imaging mechanism includes: the visible light image generated by the visible light imaging mechanism, after being cut, matches the terahertz wave image generated within the range of the depth of field of the terahertz wave imaging mechanism.

In some exemplary embodiments, the terahertz security inspection robot further includes a data processing device configured to: receive scan data from the terahertz wave imaging mechanism for the object to be inspected and generate a terahertz wave image; receive a visible light image from the visible light imaging mechanism; determine whether the object to be inspected contains a suspect item or not, based on the terahertz wave image and the visible light image; and determine, in response to determining that the object to be inspected contains a suspect item, whether the suspect item is a prohibited item or not.

In some exemplary embodiments, the terahertz security inspection robot further includes an image display device in data communication with the data processing device, and the image display device is configured to receive and display the terahertz wave image and/or the visible light image from the data processing device.

In some exemplary embodiments, a receiving antenna unit of the detector array includes at least one horn antenna, each of the at least one horn antenna includes a horn body and a waveguide connected to the horn body, and a ratio of a long side of a horn opening of the horn body to a short side of the horn opening of the horn body is greater than 1.2.

In some exemplary embodiments, the terahertz security inspection robot further includes an instruction interaction module configured to input and output various forms of instruction information.

In some exemplary embodiments, the terahertz security inspection robot further includes a main control module configured to generate an operation instruction according to an instruction received.

BRIEF DESCRIPTION OF THE DRAWINGS

FIG. 8 shows a schematic diagram of horn antennas of a terahertz wave imaging mechanism according to an exemplary embodiment of the present disclosure.

FIG. 9(a) to FIG. 9(e) show schematic diagrams of several arrangements of a detector array of a terahertz wave imaging mechanism according to an exemplary embodiment of the present disclosure.

DETAILED DESCRIPTION OF EMBODIMENTS

Although the present disclosure will be fully described with reference to the drawings containing the preferred embodiments of the present disclosure, it should be understood that those skilled in the art may modify the present disclosure described herein while obtaining the technical effects of the present disclosure. Therefore, it should be understood that the above description is a broad disclosure for those ordinary skilled in the art, and its content is not intended to limit the exemplary embodiments described in the present disclosure.

In addition, in the following detailed description, for the convenience of explanation, many specific details are set forth to provide a comprehensive understanding of the embodiments of the present disclosure. Obviously, however, one or more embodiments may also be implemented without these specific details. In other cases, well-known structures and devices are shown in diagrammatic form to simplify the drawings.

According to the present disclosure, there is provided a terahertz security inspection robot, including: a housing, including a main housing and a head housing rotatably connected to the main housing; a terahertz wave imaging mechanism used to generate a terahertz wave image of an object to be inspected, and including a mirror assembly arranged in the head housing and a detector array arranged in the main housing; and a rotating mechanism used to cause the head housing and the mirror assembly located in the head housing to rotate with respect to the main housing, so as to cause the mirror assembly of the terahertz wave imaging mechanism to be oriented in different directions to perform terahertz scanning and imaging on objects to be inspected in different inspection regions in a security inspection scene.

Figure 1:
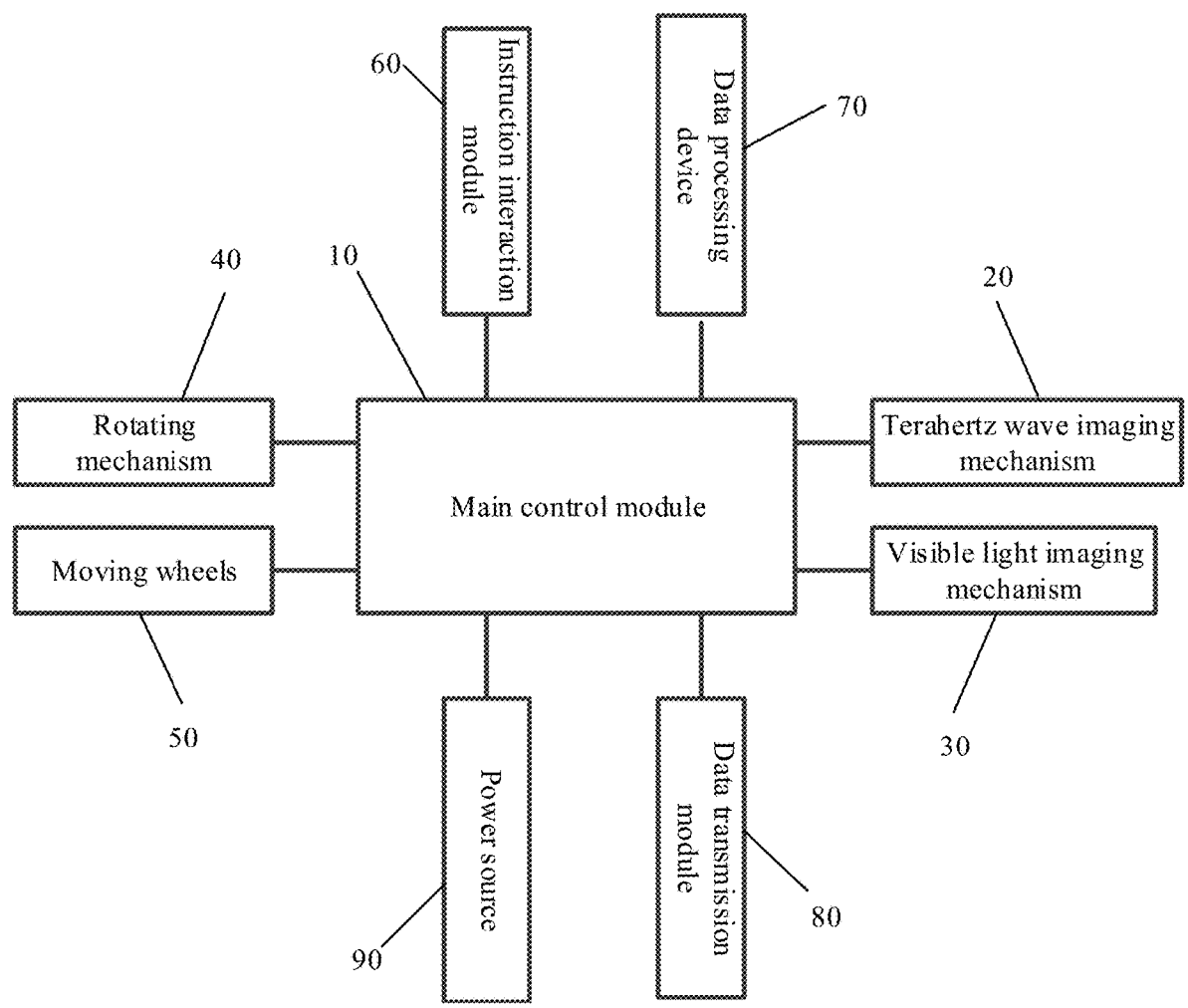
FIG. 1 shows a block diagram of a terahertz security inspection robot according to an exemplary embodiment of the present disclosure.
Figure 2:
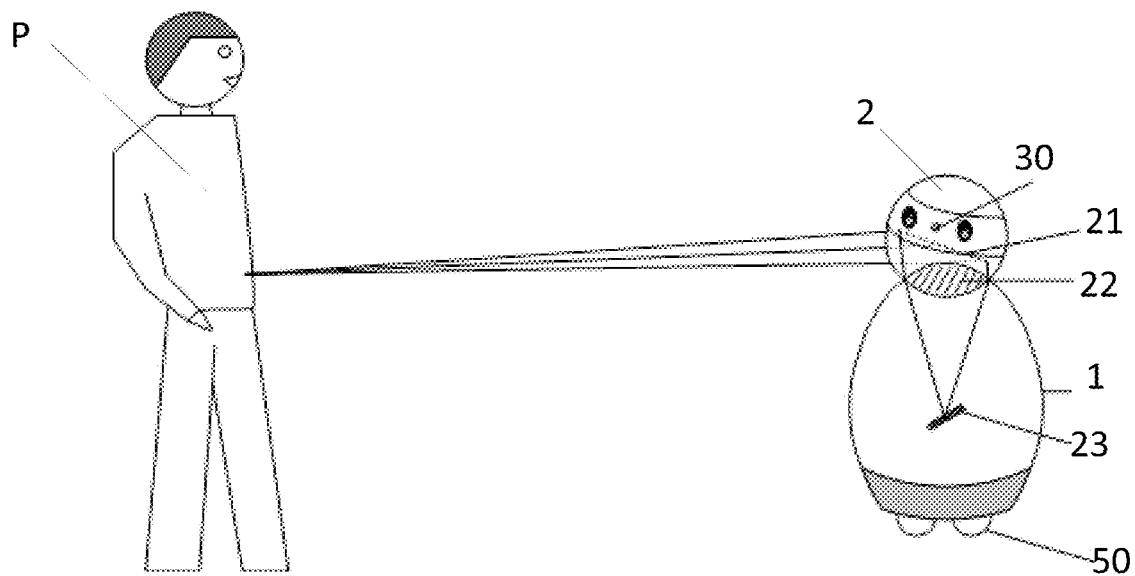
FIG. 2 shows a schematic diagram of a terahertz security inspection robot according to an exemplary embodiment of the present disclosure.
Figure 3:
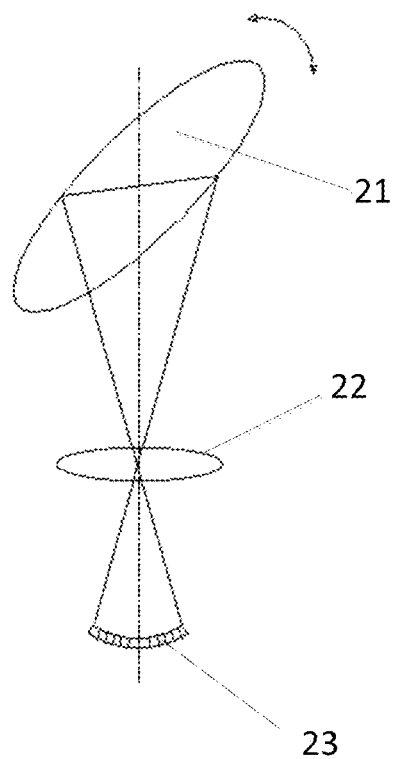
FIG. 3 shows a schematic diagram of a terahertz wave imaging mechanism of a terahertz security inspection robot according to an exemplary embodiment of the present disclosure.

As shown in FIG. 1 to FIG. 3, a terahertz security inspection robot according to an exemplary embodiment of the present disclosure includes a housing and a terahertz wave imaging mechanism 20. The housing includes a main housing 1 and a head housing 2 rotatably connected to the main housing 1. The terahertz wave imaging mechanism 20 includes a mirror 21, a focusing lens 22 and a detector array 23. A terahertz wave spontaneously radiated by an object to be inspected P is reflected by the mirror 21 to the focusing lens 22 for focusing. The focused terahertz wave is received by the detector array 23 which is located at a focal position, and is converted into an electrical signal by the detector array 23, so that terahertz wave scanning and imaging may be performed on the object to be inspected P. The terahertz security inspection robot further includes a rotating mechanism 40. The rotating mechanism 40 is used to cause the head housing 2 and the mirror assembly located in the head housing 2 to rotate with respect to the main housing 1, so that the mirror assembly of the terahertz wave imaging mechanism 20 may be oriented in different directions to respectively perform the terahertz scanning and imaging on objects to be inspected P in different inspection regions in a security inspection scene.

In the terahertz security inspection robot according to the present disclosure, the head housing 2 and the mirror assembly located in the head housing 2 may rotate with respect to the main housing 1 by using the rotating mechanism 40, so that the mirror assembly of the terahertz wave imaging mechanism 20 may be oriented in different directions. In this way, the terahertz scanning and imaging may be performed on the objects to be inspected P in different directions.

Figure 4:
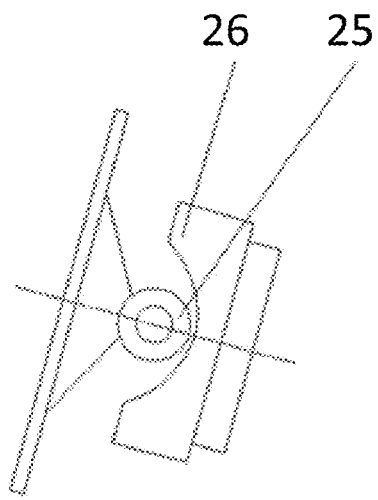
FIG. 4 shows a schematic diagram of a pitch and swing mechanism of a terahertz security inspection robot according to an exemplary embodiment of the present disclosure.
Figure 5:
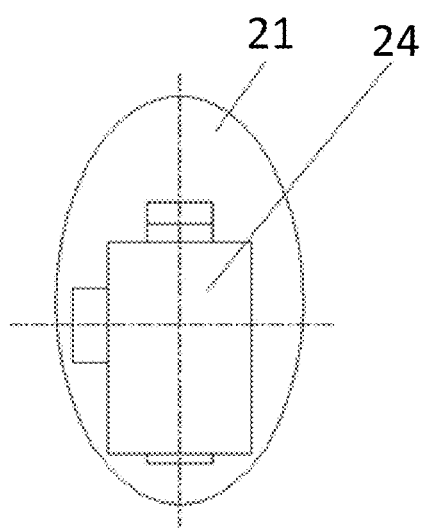
FIG. 5 shows a right side view of the pitch and swing mechanism of the terahertz security inspection robot shown in FIG. 4.

In an exemplary embodiment, as shown in FIG. 4 and FIG. 5, the mirror assembly includes a mirror 21 and a pitch and swing mechanism. The pitch and swing mechanism is used to drive the mirror 21 to pitch and swing in a vertical direction so as to cause the mirror 21 to perform the terahertz scanning and imaging on parts of the object to be inspected P with different heights. For example, the pitch and swing mechanism may include, for example, a fixed seat 24 connected to the head housing 2, an encoder 25 connected to the mirror, and a voice coil motor 26 connected to the encoder 25. The pitch and swing mechanism may also be implemented as a pitch and swing mechanism known in the art or other suitable pitch and swing mechanism.

In an exemplary embodiment, as shown in FIG. 3 to FIG. 5, a shape of the mirror 21 may be selected as an ellipse. A short axis of the mirror 21 may match a dimension of the focusing lens 22, for example, a dimension of the short axis may be 20 cm to 50 cm, and a dimension of a long axis of the mirror 21 may be, for example, 30 cm to 60 cm. A dimension of the focusing lens 22 may be determined according to an imaging distance and resolution requirements, and may meet $\delta \sim 1.22*lam*L/D$, where $\delta$ indicates a resolution, L indicates an imaging distance, lam indicates an operation wavelength, and D indicates an aperture of the focusing lens 22. According to an application scene of the present disclosure, D is generally selected as 20 cm to 40 cm.

Figure 6:
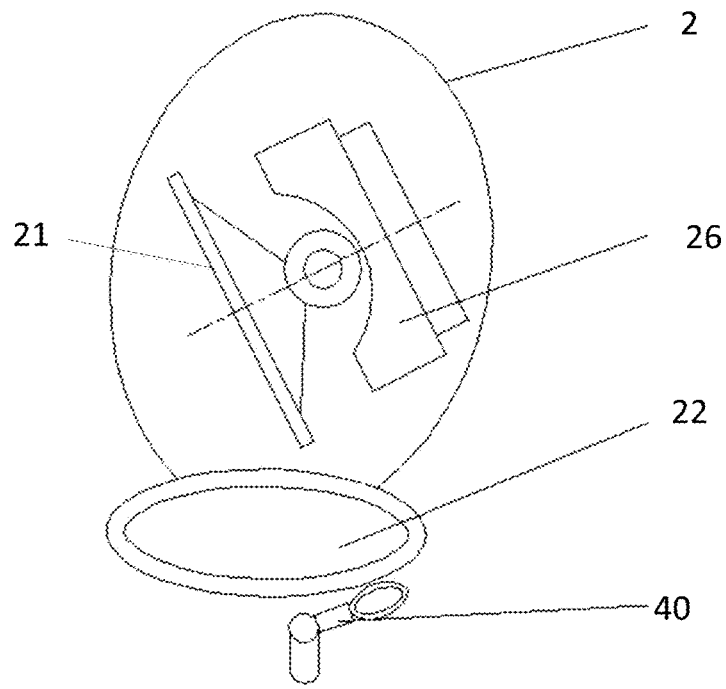
FIG. 6 shows a perspective view of a rotating mechanism, a head housing and a pitch and swing mechanism located in the head housing of a terahertz security inspection robot according to an exemplary embodiment of the present disclosure.
Figure 7:
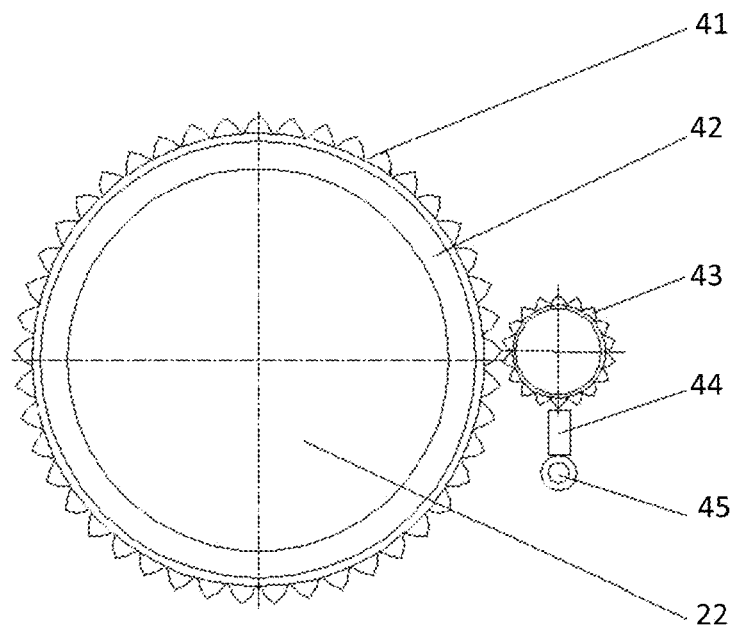
FIG. 7 shows a schematic diagram of a rotating mechanism of a terahertz security inspection robot according to an exemplary embodiment of the present disclosure.

In an exemplary embodiment, as shown in FIG. 6 and FIG. 7, the rotating mechanism 40 includes a first ring gear 41, a second ring gear 43, and a driving mechanism 45. The first ring gear 41 is connected to the head housing 2 and is located at a connection between the head housing 2 and the main housing 1. The second ring gear 43 is located in the main housing 1 and is engaged with the first ring gear 41. The driving mechanism 45 is used to drive the second ring gear 43 to rotate, so as to drive the first ring gear 41 to rotate, so that the head housing 2 and the mirror assembly located in the head housing 2 are driven to rotate. The driving mechanism 45 may be, for example, a motor that may, for example, drive the second ring gear 43 to rotate through a coupling 44, so as to drive the first ring gear 41 engaged with the second ring gear 43 to rotate, thereby driving the head housing 2 and the mirror assembly located in the head housing 2 to rotate together. It should be noted that the first ring gear 41 may rotate clockwise or counterclockwise. The focusing lens 22 is arranged inside the first ring gear 41 and is connected to the first ring gear 41 via a slip ring 42. Therefore, the focusing lens 22 remains stationary during a rotation of the first ring gear 41.

In an exemplary embodiment, the head housing 2 is provided with a window. The window may be formed of, for example, polyethylene, polytetrafluoroethylene, high-density polytetrafluoroethylene, PE, etc., and the terahertz wave spontaneously radiated by the object to be inspected P may pass through the window and reach the mirror 21. The main housing 1 and other parts of the head housing 2 may be made of materials that are not easy for terahertz waves to pass through, such as metal.

In an exemplary embodiment, a receiving antenna unit of the detector array 23 includes a plurality of horn antennas (a distance between two adjacent horn antennas is $\Delta$). As shown in FIG. 8, each of the plurality of horn antennas includes a horn body 231 and a rectangular waveguide 232 (with a length a, a width b and a height L) connected to the horn body 231. A ratio of a long side a1 of a horn opening of the horn body 231 to a short side b1 of the horn opening of the horn body 231 is greater than 1.2, for example greater than or equal to 1.5. A size of the long side a1 is determined according to the resolution required by the system on a basis that radiation performance of the horn antenna may be ensured, and a size of the short side b1 is determined according to a radiometer interval that meets Rayleigh sampling. Generally, a1>a, b1>b. However, the ratio of the long side a1 of the horn antenna to the short side b1 of the horn antenna may not be too large, otherwise the resolution may be reduced. Generally, $a1/b1 \leq 5$. In addition, in order to make the horn antenna have characteristics of high radiation efficiency, high gain, positive radiation, low side lobe, etc., a height H of the horn body 231 of the horn antenna generally satisfies $H \geq a1$, for example in a range of 1.2a1 to 1.5a1, or in a range of 1.5a1 to 2a1, or in a range of 2a1 to 3a1. For example, H may be 1.5a1, 2a1, and so on.

FIG. 9 shows several arrangements of the detector array 23 of the terahertz wave imaging mechanism 20 according to the present disclosure. In some embodiments, detectors in the detector array 23 may be arranged in a single row of arc or a plurality of rows of arcs, or arranged in a single row of straight line or a plurality of rows of straight lines, and a radius of the arc is determined by an image distance of the lens. In a case that the detectors are arranged in the plurality of rows, the plurality of rows of detectors are aligned (as shown in (b), (d) and (e) in FIG. 9) or staggered (as shown in (a) and (c) in FIG. 9). In some embodiments, in the case that the detectors are arranged in the plurality of rows, the plurality of rows of detectors have different polarization directions, so as to improve sensitivity of the terahertz wave imaging mechanism 20 and improve an image quality. For example, when the detectors are arranged in two rows, polarization directions of the two rows of detectors may be the same (as shown in (a) and (b) in FIG. 9) or orthogonal (as shown in (c) and (d) in FIG. 9). When the detectors are arranged in three rows, polarization directions of the three rows of detectors may differ by 45° (as shown in (e) in FIG. 9) or 60° or 120°, for example.

In the exemplary embodiments shown in FIG. 8 and FIG. 9, the receiving antenna unit of the detector array 23 may be implemented as horn antennas. However, those skilled in the art should understand that in some other embodiments of the present disclosure, the receiving antenna unit of the detector array 23 may also be implemented as dielectric rod antennas. Similarly, the dielectric rod antennas may be arranged in one row, two rows, three or more rows. In a case of a plurality of rows, the dielectric rod antennas may also be staggered or aligned.

In an exemplary embodiment, as shown in FIG. 1 and FIG. 2, the terahertz security inspection robot further includes a visible light imaging mechanism 30, for example, a depth camera, provided on the head housing 2. The visible light imaging mechanism 30 is used to capture a visible light image of the object to be inspected P entering into the security inspection scene, and to determine, prior to the terahertz wave imaging mechanism 20 is started to perform the terahertz scanning and imaging, a direction of the object to be inspected P with respect to the terahertz security inspection robot and a distance from the object to be inspected P to the terahertz security inspection robot.

In an exemplary embodiment, the visible light image generated by the visible light imaging mechanism 30 matches the terahertz wave image generated based on scan data of the terahertz wave imaging mechanism 20 within a range of a depth of field of the terahertz wave imaging mechanism 20. Here, the visible light image generated by the visible light imaging mechanism 30 matching the terahertz wave image generated based on the scan data of the terahertz wave imaging mechanism 20 within a range of depth of field of the terahertz wave imaging mechanism 20 refers to that: within the range of depth of field of the terahertz wave imaging mechanism 20 (for example, 0.5 m to 5 m), the visible light image generated by the visible light imaging mechanism 30 substantially corresponds to the terahertz wave image generated based on the scan data of the terahertz wave imaging mechanism 20 in a spatial position. That is, a position and a dimension of the object to be inspected P in the visible light image substantially correspond to those in the terahertz wave image.

In an exemplary embodiment, a field angle of the visible light imaging mechanism 30 is generally greater than that of the terahertz wave imaging mechanism 20. In this case, the visible light image generated by the visible light imaging mechanism 30 matching the terahertz wave image generated based on the scan data of the terahertz wave imaging mechanism 20 within a range of depth of field of the terahertz wave imaging mechanism 20 includes: the visible light image generated by the visible light imaging mechanism 30, after being cut, matches the terahertz wave image generated based on the scan data of the terahertz wave imaging mechanism 20 within a range of depth of field of the terahertz wave imaging mechanism 20.

In an exemplary embodiment, in order to ensure that the visible light image generated by the visible light imaging mechanism 30 matches the terahertz wave image generated based on the scan data of the terahertz wave imaging mechanism 20 within the range of depth of field of the terahertz wave imaging mechanism 20, the visible light imaging mechanism 30 may be positioned so that an extension of an optical axis of the visible light imaging mechanism 30 passes through a center of the mirror 21 of the terahertz wave imaging mechanism 20 (that is, an intersection of an axis of pitching and swinging and an axis of rotation).

In an exemplary embodiment, as shown in FIG. 1, the terahertz security inspection robot further includes a data processing device 70 used to receive the scan data from the terahertz wave imaging mechanism 20 for the object to be inspected P and generate the terahertz wave image. The data processing device 70 is further used to receive the visible light image from the visible light imaging mechanism 30, and determine whether the object to be inspected P contains a prohibited item or not, based on the terahertz wave image and the visible light image. For example, the data processing device 70 may determine whether the object to be inspected contains a suspect item or not, based on the terahertz wave image. If the data processing device 70 determines that the object to be inspected contains a suspect item, it may further determine whether the suspect item is a prohibited item or not, based on the visible light image and the terahertz wave image.

In an exemplary embodiment, the data processing device 70 may be used to mark one or more areas of the terahertz wave image as suspect areas where suspect items may exist by using a deep learning algorithm, when whether the object to be inspected contains a suspect item or not is determined based on the terahertz wave image. In addition, the data processing device 70 may be further used to identify an area where the object to be inspected is located based on the visible light image by using a deep learning algorithm, and remove a suspect area in response to determining that the suspect area corresponds to an area outside the area where the object to be inspected is located in the visible light image, when whether the suspect item is a prohibited item or not is determined based on the visible light image and the terahertz wave image.

In an exemplary embodiment, in response to determining that the suspect area corresponds to the area where the object to be inspected is located in the visible light image, the data processing device 70 may be further used to identify whether an item in the area of the visible light image corresponding to the suspect area is a non-hidden item or not, by using, for example, a deep learning algorithm. The data processing device 70 may determine that a prohibited item does not exist in the suspect area, in response to determining that the item in the area of the visible light image corresponding to the suspect area is a non-hidden item; and determine that a prohibited item exists in the suspect area, in response to determining that the item in the area of the visible light image corresponding to the suspect area is not a non-hidden item.

In the terahertz wave image, the terahertz wave is transmitted through outer packaging materials such as plastic, paper, textiles, and leather. Therefore, when a human body carries an item through which the terahertz wave may not be transmitted, the terahertz wave is reflected by the item, so that an outline of the item appears in the terahertz wave image. Although the outline of the item is displayed, it may not be accurately identified from the terahertz wave image whether the item is a prohibited item or not, and it may only determine that the item is a suspect item. In this embodiment, the visible light imaging mechanism 30 is provided to capture the visible light image of the object to be inspected, and the visible light image generated by the visible light imaging mechanism 30 matches the terahertz wave image generated by the terahertz wave imaging mechanism 20 within the range of depth of field of the terahertz wave imaging mechanism 20, so that it may be easier and more accurate to determine whether the suspect item in the terahertz wave image is a prohibited item or not.

In an exemplary embodiment, as shown in FIG. 1, the terahertz security inspection robot further includes an instruction interaction module 60 used to input and output various forms of instruction information. The terahertz security inspection robot further includes a main control module 10 used to generate an operation instruction according to an instruction received from a user. For example, the main control module 10 may, for example, receive voice information, analyze the voice information received and generate feedback text information according to the voice information, synthesize the feedback text information into feedback voice information, and transmit the feedback voice information to a voice interaction module of the instruction interaction module 60. In addition, the main control module 10 may be further used to control the rotating mechanism 40 for driving the head housing and the mirror assembly located in the head housing of the security inspection robot to rotate. The terahertz security inspection robot may further include a power source 90 for supplying electricity.

In an exemplary embodiment, as shown in FIG. 1, the terahertz security inspection robot may further include a data transmission module 80 used to transmit data processed by the data processing device 70 to a remote terminal, under control of the main control module 10. The data transmission module 80 may, for example, transmit the visible light image and the terahertz wave image from the data processing device 70 to a cloud platform, by using 5G transmission technology, and finally display and alarm through an image display device at an inspection terminal.

In some embodiments of the present disclosure, the visible light image acquired by the visible light imaging mechanism 30 and the scan data of the terahertz wave imaging mechanism 20 may be acquired by using a field programmable gate array (FPGA). The scan data may be filtered in the FPGA, and then the visible light image, the scan data, and positional information of the mirror 21 may be packaged according to a certain data format and transmitted to an upper computer through Gigabit Ethernet or in a wireless WiFi mode. After the scan data is received by the data processing device 70 provided at the upper computer, the terahertz wave image is re-generated. In a case that the suspect item is identified in the terahertz wave image, the suspect item is marked at a corresponding position in the visible light image, and the marked visible light image is compressed and stored on the cloud platform.

In an exemplary embodiment, the terahertz wave security inspection system 100 may further include an image display device in data communication with the data processing device 70. The image display device may receive and display the terahertz wave image and/or the visible light image from the data processing device.

In an exemplary embodiment, the data processing device 70 may be used to frame the suspect area where the suspect item/the prohibited item is located in the terahertz wave image and/or the visible light image in a specific color. The image display device may display the visible light image and the terahertz wave image in which the suspect area for the suspect item/the prohibited item is framed, so that an inspector may perform a comparison.

In an exemplary embodiment, as shown in FIG. 1 and FIG. 2, the terahertz security inspection robot may further include a plurality of omnidirectional moving wheels 50 arranged at a bottom of the terahertz security inspection robot. In this way, the security inspection robot may travel, according to an instruction from the main control module 10, to a specific location to perform the security inspection. Alternatively, the position and the orientation of the terahertz security inspection robot may be remotely controlled to switch the inspection region at any time to detect a crowd, or to track and monitor the object to be inspected P.

Figure 10:
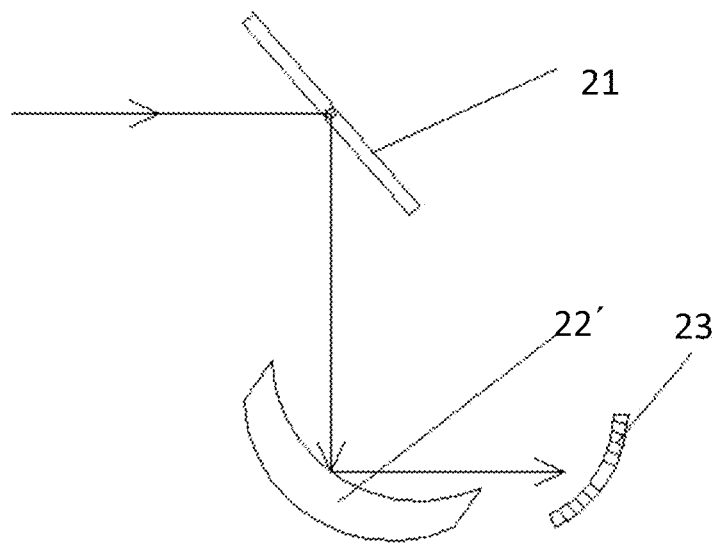
FIG. 10 shows a schematic diagram of a terahertz wave imaging mechanism of a terahertz security inspection robot according to another exemplary embodiment of the present disclosure.
Figure 11:
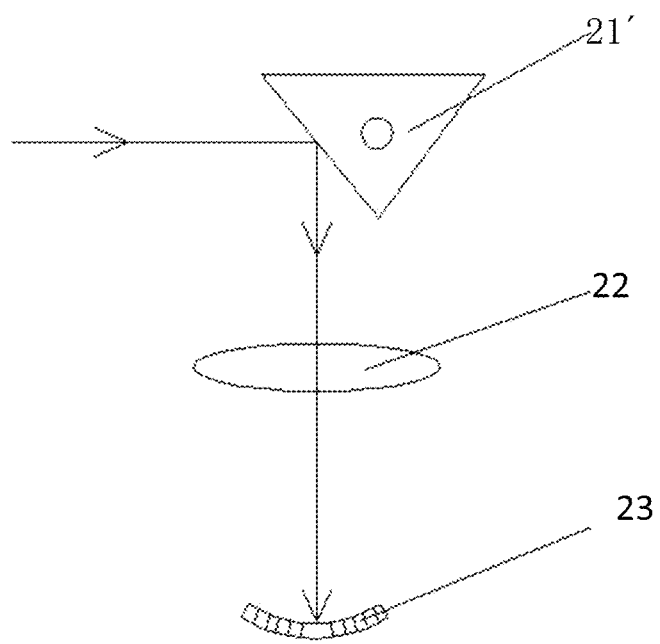
FIG. 11 shows a schematic diagram of a terahertz wave imaging mechanism of a terahertz security inspection robot according to yet another exemplary embodiment of the present disclosure.

In the exemplary embodiment described above, the terahertz wave imaging mechanism 20 may use the focusing lens 22 for focusing. However, those skilled in the art should understand that in some other embodiments of the present disclosure, the terahertz wave imaging mechanism 20 may also use an ellipsoidal reflective surface or a hyperbolic reflective surface or an even-order aspheric surface or a free-form surface 22' for focusing, as shown in FIG. 10. In the example described above, the mirror 21 is a flat ellipse. However, those skilled in the art should understand that in some other embodiments of the present disclosure, the mirror 21 may also be a polyhedral drum 21' that may rotate 360° around the axis of rotation (as shown in FIG. 11), or the mirror 21 may have a flat rectangular shape.

In the terahertz security inspection robot according to various embodiments of the present disclosure described above, by using the rotating mechanism, the head housing and the mirror assembly located in the head housing may rotate, for example, 180° or 360°, with respect to the main housing, so as to cause the mirror assembly of the terahertz wave imaging mechanism to be oriented in different directions. In this way, the terahertz scanning and imaging may be performed on the objects to be inspected in different directions. The terahertz security inspection robot may be installed in subways, railway stations and other high-traffic places to take a video of parts of a human body in an all-round way, for example, focusing on monitoring a waist of the human body, portable bags, and other parts easy to carry dangerous goods. The terahertz security inspection robot may also be easily installed in banks, hotel receptions, campus entrances, buses, offices, mailrooms, and jewelry stores where existing security inspection technologies may not be used or may not be inconveniently used. The terahertz security inspection robot may take videos throughout the entire process without the need for the inspected person to stay. The efficiency of the security inspection may reach 6 times that of the conventional manual inspection, about 1500 people/hour. Conventional security inspections may only focus on metal items, a terahertz security inspection system may inspect a variety of contraband including metals, liquids, ceramics, powders, colloids, etc., and no physical contact is required during the whole process, so that the efficiency of security inspection is improved, and the experience of security inspection is enhanced. In summary, the device is light, solid, small, sensitive, easy to move and carry, no radiation, no stay, no touch, no perception, high security, good concealment, may take videos of parts of the human body in real time, and may alarm weapons, drugs and explosives in the imaging area in real time.

Those skilled in the art may understand that the embodiments described above are exemplary, and those skilled in the art may make improvements. The structures described in the embodiments may be combined freely without conflicts in structure or principle.

After describing the preferred embodiments of the present disclosure in detail, those skilled in the art may clearly understand that various changes and modifications may be made without departing from the scope and spirit of the appended claims, and the present disclosure is not limited to implementations of the exemplary embodiments described in the present disclosure.

What is claimed is:

1. A terahertz security inspection robot, comprising:
a housing comprising a main housing and a head housing rotatably connected to the main housing;
a terahertz wave imaging mechanism comprising a mirror assembly arranged in the head housing and a detector array arranged in the main housing; and
a rotating mechanism configured to cause the head housing and the mirror assembly located in the head housing to rotate with respect to the main housing, so that the mirror assembly of the terahertz wave imaging mechanism is oriented in different directions to perform terahertz scanning and imaging on objects to be inspected in different inspection regions in a security inspection scene; and
a visible light imaging mechanism provided on the head housing, wherein the visible light imaging mechanism is configured to capture a visible light image of an object to be inspected entering into the security inspection scene, and to determine, prior to the terahertz wave imaging mechanism performing the terahertz scanning and imaging, a direction of the object to be inspected with respect to the terahertz security inspection robot and a distance from the object to be inspected to the terahertz security inspection robot, so that the visible light image generated by the visible light imaging mechanism matches a terahertz wave image generated based on terahertz wave image data acquired by the terahertz wave imaging mechanism within a range of a depth of field of the terahertz wave imaging mechanism.

2. The terahertz security inspection robot of claim 1, wherein the mirror assembly comprises a mirror and a pitch and swing mechanism, and the pitch and swing mechanism is configured to drive the mirror to pitch and swing in a vertical direction, so as to cause the mirror to perform terahertz scanning and imaging on parts of an object to be inspected with different heights.

3. The terahertz security inspection robot of claim 1, wherein the rotating mechanism comprises:
a first ring gear connected to the head housing and located at a connection between the head housing and the main housing;
a second ring gear located in the main housing and engaged with the first ring gear; and
a driving mechanism configured to drive the second ring gear to rotate so as to drive the first ring gear to rotate, so that the head housing and the mirror assembly located in the head housing are driven to rotate.

4. The terahertz security inspection robot of claim 1, wherein the head housing is provided with a window, so that a terahertz wave spontaneously radiated by an object to be inspected passes through the window and reaches the mirror assembly of the terahertz wave imaging mechanism.

5. The terahertz security inspection robot of claim 1, wherein the detector array comprises detectors arranged in a single row of arc or a plurality of rows of arcs, or arranged in a single row of straight line or a plurality of rows of straight lines.

6. The terahertz security inspection robot of claim 5, wherein in a case that the detectors are arranged in a plurality of rows, the plurality of rows of detectors are aligned or staggered, and have different polarization directions.

7. The terahertz security inspection robot of claim 1, wherein the visible light image generated by the visible light imaging mechanism matching the terahertz wave image generated based on the terahertz wave image data acquired by the terahertz wave imaging mechanism within a range of a depth of field of the terahertz wave imaging mechanism comprises: the visible light image generated by the visible light imaging mechanism, after being cut, matches the terahertz wave image generated within the range of the depth of field of the terahertz wave imaging mechanism.

8. The terahertz security inspection robot of claim 1, further comprising a data processing device configured to: receive scan data from the terahertz wave imaging mechanism for the object to be inspected and generate a terahertz wave image; receive a visible light image from the visible light imaging mechanism; determine whether the object to be inspected contains a suspect item or not, based on the terahertz wave image and the visible light image; and determine, in response to determining that the object to be inspected contains a suspect item, whether the suspect item is a prohibited item or not.

9. The terahertz security inspection robot of claim 8, further comprising an image display device in data communication with the data processing device, wherein the image display device is configured to receive and display the terahertz wave image and/or the visible light image from the data processing device.

10. The terahertz security inspection robot of claim 1, wherein a receiving antenna unit of the detector array comprises at least one horn antenna, each of the at least one horn antenna comprises a horn body and a waveguide connected to the horn body, and a ratio of a long side of a horn opening of the horn body to a short side of the horn opening of the horn body is greater than 1.2.

11. The terahertz security inspection robot of claim 1, further comprising an instruction interaction module configured to input and output various forms of instruction information.

12. The terahertz security inspection robot of claim 11, further comprising a main control module configured to generate an operation instruction according to an instruction received.

* * * * *